(12) United States Patent
Nguyen-Dinh

(10) Patent No.: US 6,291,086 B1
(45) Date of Patent: Sep. 18, 2001

(54) FRICTION WELDING INTERLAYER AND METHOD FOR JOINING GAMMA TITANIUM ALUMINIDE TO STEEL, AND TURBOCHARGER COMPONENTS THEREOF

(76) Inventor: Xuan Nguyen-Dinh, PMB 8145, 233 Paulin Avenue, Calexico, CA (US) 92231-2646

( * ) Notice: Subject to any disclaimer, the term of this patent is extended or adjusted under 35 U.S.C. 154(b) by 0 days.

(21) Appl. No.: 09/402,386
(22) PCT Filed: Apr. 3, 1998
(86) PCT No.: PCT/US98/02959
§ 371 Date: Oct. 4, 1999
§ 102(e) Date: Oct. 4, 1999
(87) PCT Pub. No.: WO98/45081
PCT Pub. Date: Oct. 15, 1998

Related U.S. Application Data
(60) Provisional application No. 60/042,690, filed on Apr. 4, 1997, and provisional application No. 60/066,445, filed on Nov. 24, 1997.

(51) Int. Cl.$^7$ .............................. B23K 20/12; B32B 15/01
(52) U.S. Cl. ................... 428/660; 148/530; 228/262.44; 428/682
(58) Field of Search .................... 148/524, 530, 148/531; 428/660, 682; 228/262.44, 264.71

(56) References Cited

U.S. PATENT DOCUMENTS 5,431,752 * 7/1995 Brogle et al. ................. 148/516

FOREIGN PATENT DOCUMENTS

| 368642 | * | 5/1990 | (EP) . |
| 590197 | * | 4/1994 | (EP) . |
| 01-192488 | * | 8/1989 | (JP) . |
| 02-078734 | * | 3/1990 | (JP) . |
| 08-144722 | * | 4/1996 | (JP) . |

OTHER PUBLICATIONS

Slueta, Edward J., "Soudage à l' Inertia Welder", *Machine Moderne*, vol. 64, No. 740, Nov. 1970.*

* cited by examiner

*Primary Examiner*—George Wyszomierski
(74) *Attorney, Agent, or Firm*—Blodgett & Blodgett, P.C.

(57) ABSTRACT

This invention concerns a method, materials, and products involving the joining of titanium aluminide to steel by welding each to an iron-based alloy interlayer or connecting piece. The interlayer can be friction welded to the steel and friction welded to the TiAl. The interlayer alloy can be an iron-based superalloy such as A-286. The friction welding of the TiAl to the interlayer can be done in three steps, each with increased pressure between the parts, with a total time of about 30 seconds. Joint strength of 412 MPa can be achieved for a 25.4 mm weld face diameter. The product can be a turbocharger rotor. The connecting piece (4) is composed of an alloy comprising the following composition in weight percent, Ni, less than or equal to 31.99, Fe, greater than 45.69, preferably, Ni, less than or equal to 30, Fe, greater than 50; and optimally, Ni, less than or equal to 28, Fe, greater than 52.

12 Claims, 1 Drawing Sheet

FRICTION WELDING INTERLAYER AND METHOD FOR JOINING GAMMA TITANIUM ALUMINIDE TO STEEL, AND TURBOCHARGER COMPONENTS THEREOF

CROSS-REFERENCE TO RELATED APPLICATIONS

This application claims the benefit under 35 U.S.C. §119 (e) of prior U.S. Provisional Application No. 60/042,690, filed Apr. 4, 1997, and prior U.S. Provisional Application No. 60/066,445, filed Nov. 24, 1997; both of which are hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention concerns materials and methods for joining γ-titanium aluminide and steel by welding.

BACKGROUND OF THE INVENTION

1. Field of the Invention

The invention relates to a process for joining blanks or structural components of steel to those of γ-titanium aluminide, and it includes turbocharger components obtained by the process. The invention teaches the use of an interlayer as a connecting piece between the steel and γ-titanium aluminide components. The connecting piece, made of an iron-base alloy, is first joined to the steel component by either inertia welding or friction welding or electron beam welding. The resulting connecting piece/steel body is then joined to the γ-titanium aluminide component by friction welding or electron beam welding at the free interlayer surface.

2. Discussion of Background

The joining of dissimilar materials plays a critical role in advanced manufacturing technology, since different properties are required within any particular application, which properties cannot be obtained by a single material. Depending on the manufacture and operating function, different materials are used for individual elements of a machinery component or structure to achieve an optimum of economical manufacture and mechanical properties.

Turbochargers are used to improve the performance of gasoline and diesel internal combustion engines. A key component of this turbomchinery, the turbocharger rotor, consists of a steel shaft, connected at one end to a trine wheel, and at the opposite end, to compressor wheel. In a typical example, the turbine wheel, cast from a nickel-base alloy (usually Inconel 713 C), is metallurgically joined to the steel shaft by inertia welding. The compressor wheel, cast from an aluminum alloy, is mechanically affixed to the steel shaft.

Although this selection of materials for the different components of the turbocharger rotor has met the requirements of the operating conditions of current turbocharging systems, further performance improvement can be only achieved by replacing the nickel-base alloy (with density of 7.9 g/cm$^3$) used in the turbine wheel by a lightweight material, exhibiting at least comparable high temperature strength (on a density corrected basis). Attempts made to commercialize ceramic turbine wheels (basically silicon nitride, with a density of 3.2 g/cm$^3$) for transportation systems have met with only partial success, due to high manufacturing costs and reliability of the joint between the ceramic component and the steel shaft. However, since early 1990, cast gamma-titanium aluminides (γ-TiAl, with a density of 3.8 g/cm$^3$) have emerged as a potential substitution material for nickel-base alloys in turbocharging systems, with the resulting impetus to provide a reliable and cost effective joint between the steel shaft and the γ-TiAl turbine wheel.

The steel grade selected for shaft components in thermal machinery is usually quenched and tempered steel, for example 4140 steel, because of its high tensile strength and wear resistance. When exposed to cooling from elevated temperatures, such as is the case when joining the steel shaft to a γ-TiAl turbine wheel to form a turbocharger rotor, the steel experiences a martensitic transformation at the surface in contact with the γ-TiAl. The nucleation of the martensite phase is accompanied by a volume expansion. A direct contact between the γ-TiAl and the steel components results in a high tensile stress on the γ-TiAl at the TiAl/martensite interface due to this volume expansion, causing cracking and failure of the joint.

The prior art has been e s tablished by:

Y. Nishiyama et al., "Development of Titanium Aluminide Turbocharger Rotors", iegh Temperature Aluminides and Intermetallics, edited by S. H. Whang, et al., The Minerals, Metals & Materials Society, 1990.

Brogle et al., "Friction Welding of Ga mma Titanium Aluminide to Steel Body with Nickel Alloy Connecting Piece There Between", U.S. Pat. No. 5,431,752, issued Jul. 11, 1995.

The prior art has recognized a benefit in using an interlayer as a buffer material in the friction welding of γ-TiAl to steel. The Nishiyama work report s the use of a connecting piece of a nickel-based alloy Inconel 751 (Ni-0.05 C-15.5 Cr-0.95 Mo-1.2 Al-2.3 Ti-7.0 Fe) having a nickel content of over 70 percent by weight (wt%). The U. S. Pat. No. 5,431,752 pat. discloses the use of a connecting piece of a nickel-base alloy containing less than 65 wt % nickel, less than 30 wt. % iron, and 3 to 7 wt. % niobium. The '752 patent teaches that the friction welding joint of the γ-TiAl component to the connecting piece can be produced at compaatively low temperatures, using a rubbing cycle lasting up to 120 seconds, preferably 60 to 80 seconds. However, this rubbing time is impracticable for high production volume.

These and other difficulties experienced with the prior art devices (chemical processes) have been obviated in a novel manner by the present invention.

Accordingly, one object of the invention is to develop a novel process, by which blanks or structural components of steel can be joined to those of γ-TiAl by friction welding within a short cycle time, less than about 30 seconds, with the goal of achieving a tensile joint strength suitable for use as a turbocharger rotor in turbocharging machinery. The short cycle is commensurate with industrial practice for high volume production (in the hundreds of thousands of units per year).

Another object of this invention is to provide a turbocharger rotor, with a γ-TiAl turbine wheel capable of operating at temperatures up to 700° C. The room temperature strength of the steel/γ-TiAl joint achieved by this novel process is suitably adequate for subsequent manufacturing operations of the turbocharger rotor, such as turning, grinding, etc.

It is still another object of this invention to provide an interlayer material which exhibits progressive compatibility between the steel and the γ-TiAl blanks or components. Joining of said blanks or components is achieved with insertion of an iron-rich connecting piece, which is metallurgically compatible with each component and suitable for inertia or friction welding. The connecting piece or interlayer in the finished joint is as thin as possibly permitted by the design and operation of the turbocharger rotor, preferably less than 10 mm in thickness for turbine wheels having a blade tip diameter of 90 mm or less.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention:

BRIEF SUMMARY OF THE INVENTION

This invention concerns a method, materials, and products involving the joining of titanium aluminide to steel by welding each to an iron-based alloy interlayer or connecting piece. The interlayer can be friction welded to the steel and friction welded to the TiAl. The interlayer alloy can be an iron-based superalloy such as A-286. The friction welding of the TiAl to the interlayer can be done in three steps, each with increased pressure between the parts, with a total time of about 30 seconds. Joint strength of 412 MPa can be achieved for a 25.4 mm weld face diameter. The product can be a turbocharger rotor.

The joining of the steel to the interlayer is carried out in a routine manner by inertia welding or by friction welding. After weld bead removal, the resulting interlayer / steel body is positioned in the friction welding machine with the interlayer end facing the γ-TiAl surface to be joined. Friction welding is carried out with one component being in rotation, while the other is stationary. Which component is stationary is just a matter of convenience and commensurate with the machine set up. Electron-beam welding can also be used to join the interlayer to the TiAl and to the steel.

Conventional friction welding machines can be used at fixed speeds of rotation or with infinite adjustment of the speed of rotation. In the method according to the invention, speeds of rotation in the regime of 1000 to 1500 rpm were employed. Friction can be controlled either for an experimentally determined amount of rubbing time, or to a certain amount of 10 length loss (referred to as upset loss). However, it was found that more beneficial results were obtained under upset loss control.

During the rubbing cycle, pressure was applied in steps, with the final step reaching a first limit in the range of 310 to 340 N/mm². Immediately following the rubbing cycle, rotation ceased while an upsetting pressure in the range of 350 to 520 N/mm² as a second limit was applied to the components at rest. Special features of the invention can be taken from the following description and examples.

BRIEF DESCRIPTION OF THE DRAWINGS

The character of the invention, however, may best be understood by reference to one of its structural forms, as illustrated by the accompanying drawings, in which.

DETAILED DESCRIPTION OF THE INVENTION

Figure 1:
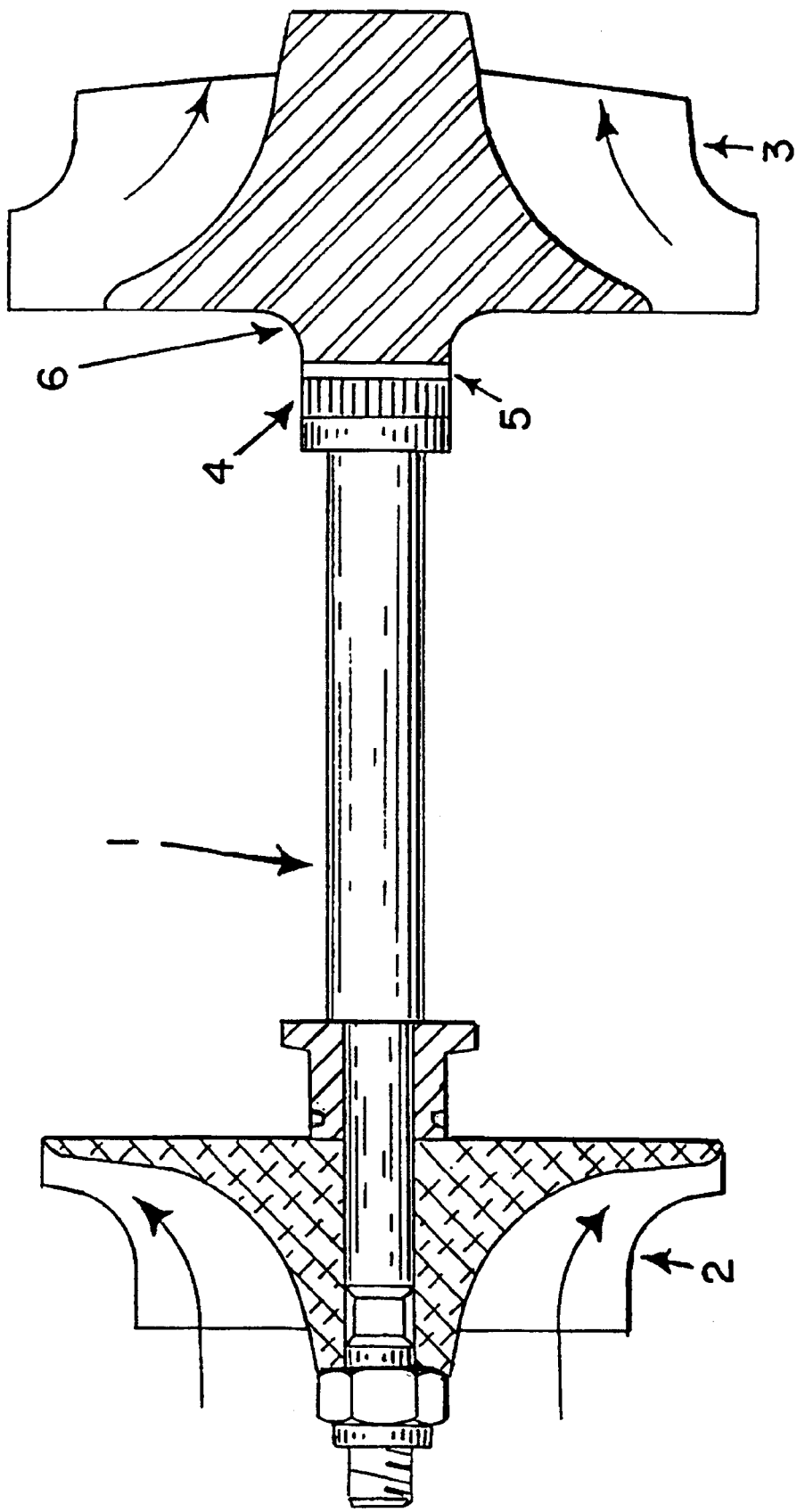
FIG. 1 is a longitudinal cross-sectional view of a turbocharger rotor which embodies the principles of the present invention.

A more complete appreciation of the invention and many attendant advantages thereof will be obtained by referring to the FIG. 1 and the following description of the preferred embodiments. The drawing shows the longitudinal cross-sectional view of a turbocharger rotor. The arrows indicate the flow paths of intake air and engine exhaust gas when the turbocharger rotor is installed in the turbocharging unit.

The turbocharger rotor consists of the following components: a cylindrical steel shaft 1 mechanically attached at one end to an aluminum compressor wheel 2, and metallurgically joined at the opposite end to a γ-TiAl turbine wheel 3, via a connecting piece 4. The symbol 5 denotes a diffusion layer which provides the joint between the connecting piece 4 and the γ-TiAl turbine wheel 3. The symbol 6 denotes the welding boss on the γ-TiAl side, having essentially the same diameter as that of the connecting piece.

The connecting piece is a disk with a thickness of about 10 mm or less, for the case of a turbine wheel with a blade tip diameter of 90 mm or less. The connecting piece is selected from an iron-rich alloy with the following provisions (composition in weight percent):

Ni 23.5 to 41.0
Fe 37.8 to 60.0 (or balance)
Cr 11.0 to 26.0
Mo less than 3.0
W less than 2.6
Nb less than 3.0
Al less than 0.7
Ti less than 2.3
V less than 0.6
Si 0.1 to 1.0
Mn 0.1 to 2.0
C up to 0.08
Cu up to 0.2
B up to 0.01
Zr up to 0.02 Further, the Fe/Ni ratio fulfills the following relationships:

$$Fe/Ni=-66/(Ni-20)^2+24.5/(Ni-20) \qquad (1)$$

and/or $$Fe/Ni=1.02 \text{ to } 2.50 \qquad (2)$$

The connecting piece is composed of an alloy comprising the following composition in weight percent, Ni, less than or equal to 31.99, Fe, greater than 45.69; preferably, Ni, less than or equal to 30, Fe, greater than 50; and optimally, Ni, less than or equal to 28, Fe, greater than 52. In terms of range, the connecting piece is composed of an alloy comprising the following composition in weight percent, Ni, 20 to 30, Fe, 50 to 60; preferably, Ni, 25 to 27, Fe, 52 to 56; and optimally, Ni, 26, Fe, 54.8. The connecting piece is composed of an alloy comprising a Fe/Ni composition ratio in weight percent of greater than or equal to 1.43, preferably greater than or equal to 1.5; and optimally, greater than or equal to 2. In terms of t range, the connecting piece is composed of an alloy comprising a Fe/Ni composition ratio in weight percent of greater than or equal to 1.5 to 2.5, preferably greater than or equal to 2 to 2.2; and optimally, greater than or equal to 2.11.

The steel blank or shaft is manufactured from a quenched and tempered grade referred to as 4140 steel in the industry.

In the following examples, the steel shaft was first joined to the connecting piece by friction welding, although inertia welding could be carried out in a routine manner as well. After the joining, the resulting connecting piece/steel body was stress relieved by thermal exposure in air at 560° C. for about one hour.

Except for one particular instance in Example 1, the connecting piece material used in the examples was supplied by Carpenter Technology Corporation, which markets their trademark Pyromet Alloy A-286, with the following composition (in weight percent):

Ni 24.0 to 27.0

Cr 13.5 to 16.0

Mo 1.00 to 1.75

Al 035 max.

Ti 1.9 to 2.3

V 0.1 to 0.5

Si 1.0 max.

Mn 2.0 max.

C 0.08 max.

B 0.003 to 0.010

Fe balance (about 49.0 to 59.3, depending on the analyzed values of the other elements)

Using all possible variations of the elements within the composition range of Pyromet Alloy A-286, the Fe/Ni ratio was found to vary between 1.82 and 2.47, thereby meeting the requirements of relationship (2) prescribed above. Taking now Ni=25.5 weight percent as the mid-point value of the Ni content within the range prescribed in Pyromet Alloy A-286, and using relationship (1) shown above yields an Fe/Ni ratio of 2.27, therefore a recommended Fe content of 58.0 weight percent. This latter result is within the range of Fe in the composition of Pyromet Alloy A-286 and is 7% higher than the mid-point of the Fe range. Thus, it can be seen that the composition of Pyromet Alloy A-286 not only meets the compositional range set forth for the interlayer material, but also the requirements set forth by relationships (1) and (2).

EXAMPLE 1

A series of turbine wheels were cast from the following two γ-TiAl alloys whose 20 compositions (in atomic percent) are covered by U.S. patents:

Alloy 2 (U.S. Pat. No. 5,207,982): $Ti_{Bal.}Al_{46.4}W_{20}Si_{0.6}$

Alloy 11 (U.S. Pat. No. 4,294,615): $Ti_{Bal.}Al_{49.0}C_{0.15}$

In this example and the following two examples, the weld face on the γ-TiAl had a nominal diameter of 21.6 nmm. Accordingly, after the joining of the connecting piece to the steel shaft by friction welding and after weld bead removal, the connecting piece end of the steel/connecting piece body was machined from a starting diameter of 25.4 mm to about 21.6 mm.

Joining of the γ-TiAl turbine wheel to the connecting piece/steel body was carried out for each of the two γ-TiAl alloys using a two-step approach of applying the pressure during the rubbing cycle. Also, due to the physical set up of the friction welding machine employed in this example and thereafter, it was convenient to rotate the γ-TiAl component, while the connecting piece/steel body was stationary. The speed of rotation selected for Example 1 was 1500 rpm.

During the rubbing cycle, a constant pressure of $P_1=98$ $N/mm^2$ was applied in the first step for a duration of $t_1=15$ seconds, followed by a second constant pressure $P_2=197$ $N/mm^2$ which was applied in the second step for a duration of $t_2=3$ seconds. The total rubbing time in this example and thereafter was targeted to be less than about 20 seconds. Variations by as much as a factor of 2 in the $t_2$ parameter could result from a change from time control to upset loss control during this portion of the rubbing cycle. As a result of such a change, the $t_1$ parameter was modified so as to keep the total rubbing time within 20 seconds.

The upset loss is defined as the amount of length shortening during friction welding. In the friction welding machines used in the examples of the preferred embodiments, it was possible to set in advance the desired upset loss during the rubbing cycle. A feedback loop in the machine carried out the instruction to achieve the targeted upset loss, with the small variations in the time to attain the target value resulting from inherent structural inhomogeneity in the γ-TiM side.

At the conclusion of the rubbing cycle, the components were immediately brought to rest while an upsetting pressure $P_3=295$ $N/mm_2$ (for this example) was maintained for a duration $t_3$, from 5 to 10 seconds, with the provision that the total time to perform the joining of the γ-TiAl turbine wheel to the connecting piece/steel body is within 30 seconds. In this example the duration $t_3$ was 5 seconds. The parameters selected for this series of experiments (referred to as Group A) in Example 1 are summarized in the table shown below. In subsequent examples, the same general experimental procedures were followed, except for the, specific value selected to perform each step. The combination of these variations, chosen within certain limits, will illustrate the advantages provided by the teachings of this invention.

| Group | $t_1$ $t_2$ $t_3$ (seconds) | | | $P_1$ $P_2$ $P_3$ (MPa) | | | RPM | Upset loss (mm) | Remarks |
|---|---|---|---|---|---|---|---|---|---|
| A | 15 | 3 | 5 | 98 | 197 | 295 | 1500 | 3.0 | Time control |

Accordingly, one turbine wheel from each γ-TiAl alloy was friction welded to the connecting piece/steel body. After weld bead removal, each welded assembly was subjected to tension testing at room temperature. The assemblies failed at the joint at a fracture stress of 108 MPa for the assembly containing the Alloy 11 turbine wheel, and at 114 MPa for the other assembly containing the Alloy 2 turbine wheel.

In a third experiment conducted in Example 1, instead of Pyromet Alloy A-286 as interlayer material, a different material (Inconel 718) prescribed in U.S. Pat. No. 5,431,752 was used. A sample of the nickel-base alloy Inconel 718 was joined by friction welding in a routine manner to the steel shaft. Stress relief and weld bead removal were performed in the same fashion as for the case with Pyromet Alloy A-286.

An attempt was made to join the Inconel 718/steel body to an Alloy 2 turbine wheel, employing the same parameters (Group A) selected for the first two experiments. After interruption of the $P_3$ pressure, the assembly appeared to have been successfully joined together for a few seconds, before the Inconel 718/steel body separated from the assembly on its own weight. In all examples, the γγTiAl blank or turbine wheel remained firmly located in the machine thanks to a special fixture, while the connecting piece/steel body was in a cantilevered position at the joint face after machine disconnect.

If there was no bonding at the γ-TiAl/connecting piece interface, the connecting piece/steel body would be readily separated from the γ-TiAl after machine disconnect. If there was minimal bonding, due to mechanical locking of surface irregularities on the mating surfaces rather than a metallurgical joint, the assembly would appear to have been joined until the combined action of the difference in thermal expansion of the mating materials and the bending force exerted by the weight of the steel body at the "joint" interface caused separation within seconds after machine disconnect.

This short time delay could be attributed to the brittle behavior of the γ-TiAl at the mechanical locks as the material underwent the ductile-brittle transition regime when the heat generated at the joint interface was rapidly dissipated by convection and conduction. This also points to the critical role played by the duration of the application of the $P_3$ pressure. A short duration will further exacerbate the brittle behavior of the γ-TiAl, while a long duration will adversely affect productivity.

Those skilled in the art can recognize the benefits of a judicious combination of process parameters to obtain a joint strength commensurate with the particular application for which the turbocharger rotor is intended. The joint strength is ultimately influenced by the metallurgical compatibility of the diffusion layer formed between the γ-TiAl and the connecting piece. That there was no joining when Inconel 718 was selected as interlayer material was probably due to the fact that during the short duration of the rubbing cycle (18 seconds for the experiments of this example, whereas U.S. Pat. No. 5,431,752 prescribes 60 to 80 seconds) there was not enough time allowed for the formation of a compliant diffusion layer at the joint interface.

On the other hand, the choice of Pyromet Alloy A-286, which meets the selection criteria for the interlayer material, led to the formation of a compliant diffusion layer during a shorter rubbing cycle. Although the joint strength obtained with the process parameters employed in Example 1 was low, those skilled in the art could realize further improvement within the scope taught by the following examples of the preferred embodiments.

EXAMPLE 2

In this example, a series of turbine wheels were produced from an XD™ alloy. The XD alloy concept, patented by Martin Marietta, represents a means to incorporate $TiB_2$ particles in a γ-TiAl matrix, essentially creating a particulate-reinforced composite structure, The nominal composition (in atomic percent) of the alloy selected for this example is $Ti_{Bal}.Al_{47}Nb_2Mn_2$ reinforced by 0.8 volume percent $TiB_2$. In this example and thereafter, Pyromet Alloy A-286 was chosen as interlayer material. The surface to be joined had a diameter of 21.6 mm. Joining was performed on two groups of turbine wheels, using the following parameters:

| Group | $t_1$ $t_2$ $t_3$ (seconds) | $P_1$ $P_2$ $P_3$ (MPa) | RPM | Upset loss (mm) | Remarks |
|---|---|---|---|---|---|
| B | 5  3  10 | 129  310  516 | 1500 | 1.2 | Time control |
| C | 5  —  10 | 129  310  516 | 1500 | 1.7 | Upset loss control |

The one difference in the parameters selected for Group C was the change from time control in step 2 of the rubbing cycle to upset loss control (during step 2). The previous table also lists the resulting total upset loss: 1.2 mm for Group B and 1.7 mm for Group C. As indicated in this example and the following examples, the total upset loss is also an important contributing factor, which plays a feedback role for the overall performance of the primary parameters (time, pressure, speed of rotation). Tension testing performed at room temperature resulted in the following fracture strength of the joint: 140 MPa for Group B and 295 MPa for Group C. Clearly, a higher joint strength was achieved with control of upset loss.

EXAMPLE 3

In Example 3, a series of turbine wheels were cast from a γ-TiAl alloy designated as Alloy 4, whose composition is covered by a U.S. patent application. The analyzed composition (in atomic percent) of this alloy is: $Ti_{Bal}.Al_{46.2}B_{0.24}Cr_{1.2}W_{0.7}Si_{0.47}$. Again, the surface to be joined exhibited a nominal diameter of 21.6 mm. Joining was conducted on two groups of turbine wheels, using the following parameters:

| Group | $t_1$ $t_2$ $t_3$ (seconds) | $P_1$ $P_2$ $P_3$ (MPa) | RPM | Upset loss (mm) | Remarks |
|---|---|---|---|---|---|
| D | 5  3  10 | 129  310  516 | 1500 | 1.8 | Time control |
| E | 5  3  5 | 129  292  486 | 1500 | 2.1 | Time control |

It should be noted that the parameters selected for Group D are the same as those selected for Group B in Example 2. However, the upset loss experienced by the Group D samples was 50% higher (1.8 mm vs. 1.2 mm), owing to the difference in the high temperature flow characteristics of Alloy 4 and the XI) alloy. The presence of the $TiB_2$ particles in the XD alloy provides a higher creep resistance, hence a smaller deformation or upset loss.

The pressures selected for the Group E experiments were about 94% of the corresponding values chosen for the Group D experiments in an effort to investigate the effect of pressure fluctuations in the machine. At the same time, the duration $t_3$ was drastically cut in half to investigate its effect on joint strength. Room temperature tension testing resulted in similar joint strengths as follows: 254 MPa for Group D samples and 267 MPa for Group E samples. Thus, these results demonstrate the robust nature of the joining process within a certain process window.

EXAMPLE 4

In Example 4, another series of blanks and turbine wheels were cast from Alloy 4. These samples exhibited a weld surface with a diameter of 25.4 mm. Hence, the area to be joined was increased by 38% as compared to the samples in the previous examples. Also, the Alloy 4 blanks were designed to represent a stylized version of the turbine wheel to facilitate tension testing. Friction welding was conducted on two group of samples, with Group F consisting of blanks and Group G consisting of turbine wheels, according to the following set of parameters:

| Group | $t_1$ $t_2$ $t_3$ (seconds) | $P_1$ | $P_2$ (MPa) | $P_3$ | RPM | Upset loss (mm) | Remarks |
|---|---|---|---|---|---|---|---|
| F | 5 — 10 | 121 | 272 | 351 | 1275 | 2.5 | Upset loss control |
| G | 5 — 5 | 162 | 334 | 404 | 1050 | 2.5 | Upset loss control |

Although the two sets of paraeeters were different, they resulted in the same amouni of total upset loss (2.5 mm). On the other hand, tension testing provided drastic differences in room temperature joint strengths: 215 MPa for Group F and 129 MPa for Group G. The most critical difference between the two set of parameters is the duration $t_3$ which was cut in half for the Group G samples. Due to the greater weld surface encountered in this example, a longer upsetting time was required to allow heat generated at the weld interface to dissipate during the upsetting cycle, so as to facilitate an unconstrained loading of the γ-TiAl material near the weld interface during cool down. One way to improve the mechanical performance of the joint interface is to decrease the amount of total upset loss, which was conducted in Example 5.

EXAMPLE 5

In Example 5 another series Alloy 4 turbine wheels with a w held face diameter of 25.4 mm were friction welded using the following parameters:

| Group | $t_1$ $t_2$ $t_3$ (seconds) | $P_1$ | $P_2$ (MPa) | $P_3$ | RPM | Upset loss (mm) | Remarks |
|---|---|---|---|---|---|---|---|
| H | 5 5 5 | 162 | 334 | 404 | 1050 | 2.1 | Time control |

The parameters selected for the Group H samples were essentially similar to those selected for the Group G samples, except for a critical difference that time control was used during step 2 of the rubbing cycle, instead of upset loss control. Since the $t_2$ duration was shorter (about a factor of 2), a smaller total upset loss resulted (2.1 mm vs. 2.5 mm). Tension testing provided a room temperature joint strength of 412 MPa. Turbocharger rotors manufactured in the manner described in Example 5 were furnished to a turbocharger manufacturer, who successfully tested these assemblies in a laboratory test bed. From the foregoing, it should be apparent that those skilled in the art could realize still further improvements of the novel process with the teachings of this invention.

SUMMARY OF PROCESS PARAMETERS IN THE EXAMPLES

| Group | $t_1$ $t_2$ $t_3$ (seconds) | $P_1$ | $P_2$ (MPa) | $P_3$ | RPM | Upset loss (mm) | Joint strength (MPa) |
|---|---|---|---|---|---|---|---|
| H | 5 5 5 | 162 | 334 | 404 | 1050 | 2.1 | 412 |
| G | 5 — 5 | 162 | 334 | 404 | 1050 | 2.5 | 129 |
| F | 5 — 10 | 121 | 272 | 351 | 1275 | 2.5 | 215 |
| E | 5 3 5 | 122 | 292 | 486 | 1500 | 2.1 | 254 |
| D | 5 3 10 | 129 | 310 | 516 | 1500 | 1.8 | 267 |
| C | 5 — 10 | 129 | 310 | 516 | 1500 | 1.7 | 295 |
| B | 5 3 10 | 129 | 310 | 516 | 1500 | 1.2 | 140 |
| A | 15 3 5 | 98 | 197 | 295 | 1500 | 3.0 | 114 |

While it will be apparent that the illustrated embodiments of the invention herein disclosed are calculated adequately to fulfill the object and advantages primarily stated, it is to be understood that the invention is susceptible to variation, modification, and change within the spirit and scope of the subjoined claims.

The invention having been thus described, what is claimed as new and desire to secure by Letters Patent is:

1. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an iron-base alloy comprising the following composition (weight percent):
    Ni 24.0to27.0
    Cr 13.5 to 16.0
    MO 1.00 to 1.75
    Al 0.35 max.
    Ti 1.9to2.3
    V 0.1 toO.5
    Si 1.0 max.
    Mn 2.0 max.
    C 0.08 max.
    B 0.003 to 0.010
    Fe balance (about 49.0 to 59.3, depending on the analyzed values of the other elements);

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

2. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an alloy for the connecting piece comprising the following composition in weight percent:
    Ni less than or equal to 28
    Fe greater than 52;

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

3. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an alloy for the connecting piece comprising the following composition in weight percent:
Ni 25 to 27
Fe 52 to 56;

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

4. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an iron-base alloy for the connecting piece comprising the following composition in weight percent:
Ni 26
Fe 54.8;

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

5. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an iron-base alloy for the connecting piece comprising a Fe/Ni composition ratio in weight percent of greater than or equal to 2;

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

6. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an iron-base alloy for the connecting piece comprising a Fe/Ni composition ratio in weight percent of 2.0 to 2.2;

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

7. A process of producing a component consisting of a gamma-titanium aluminide body joined to a steel body, by means of a connecting piece composed of an iron-base alloy inserted between the two bodies and rigidly joined to both bodies, and comprising the following steps:

(a) selecting an iron-base alloy for the connecting piece comprising a Fe/Ni composition ratio in weight percent of 2.11;

(b) first joining the connecting piece to the steel body by welding;

(c) subsequently, conducting a rubbing step, by contacting, with relative rotation, the gamma-titanium aluminide body to the connecting piece end of the connecting piece/steel body, and by friction welding procedure, rubbing the mating faces of the two bodies while applying a rubbing pressure which does not exceed a first limit value; and (d) conducting a welding step, by welding the gamma-titanium aluminide body to the connecting piece at rest with respect to one another, under an upsetting pressure, which is higher than the first limit value and which does not exceed a second limit value.

8. A process of producing a component consisting of a gamma-titanium aluminide body joined to a second body, by means of a connecting piece composed of an iron-based alloy inserted between the two bodies and rigidly joined to both bodies, and comprising the following steps:

(a) selecting as said iron-based alloy a composition comprising at least 50 but less than 60 weight percent of iron, at least 24 but less than 27 weight percent of nickel;

(b) first joining the connecting piece to the second body by welding; and (c) subsequently, conducting a welding step to join the gamma-titanium aluminide body to the connecting piece.

9. A process of producing a component consisting of a gamma-titanium aluminide body joined to a second body, by means of a connecting piece composed of an iron-based alloy inserted between the two bodies and rigidly joined to both bodies, and comprising the following steps:

(a) selecting as said iron-based alloy a composition comprising (weight percent):
Ni 24.0 to 27.0
Cr 13.5 to 16.0
MO 1.00 to 1.75
Al 0.35 max.
Ti 1.9 to 2.3
V 0.1 to 0.5
Si 1.0 max.
Mn 2.0 max.
C 0.08 max.
B 0.003 to 0.010
Fe balance (about 49.0 to 59.3, depending on the analyzed values of the other elements);

(b) first joining the connecting piece to the second body by welding; and (c) subsequently, conducting a welding step to join the gamma-titanium aluminide body to the connecting piece.

10. A process of producing a component consisting of a gamma-titanium aluminide body joined to an iron-based alloy body, and comprising the following steps:

(a) selecting as said iron-based alloy a composition comprising at least 50 but less than 60 weight percent of iron, at least 24 but less than 27 weight percent of nickel; and (b) conducting a welding step to join the gamma-titanium aluminide body to the iron-based alloy body.

11. A process of producing a component consisting of a gamma-titanium aluminide body joined to an iron-based alloy body, and comprising the following steps:

(a) selecting as said iron-based alloy a composition (weight percent):
Ni 24.0 to 27.0
Cr 13.5 to 16.0
MO 1.00 to 1.75
Al 0.35 max.
Ti 1.9 to 2.3
V 0.1 to 0.5
Si 1.0 max.
Mn 2.0 max.
C 0.08 max.
B 0.003 to 0.010
Fe balance (about 49.0 to 59.3, depending on the analyzed values of the other elements); and (b) conducting a welding step to join the gamma-titanium aluminide body to the iron-based alloy body.

12. A product comprised of:

(a) an interlayer having a first side and a second side, and formed of an iron-based alloy having the composition (weight percent):
Ni 24.0 to 27.0
Cr 13.5 to 16.0
MO 1.00 to 1.75
Al 0.35 max.
Ti 1.9 to 2.3
V 0.1 to 0.5
Si 1.0 max.
Mn 2.0 max.
C 0.08 max.
B 0.003 to 0.010
Fe balance (about 49.0 to 59.3, depending on the analyzed values of the other elements); and (b) a gamma-titanium aluminide body welded to the said first side of the interlayer, and steel body welded to the said second side of the interlayer.

* * * * *

UNITED STATES PATENT AND TRADEMARK OFFICE
CERTIFICATE OF CORRECTION

PATENT NO. : 6,291,086 B1
DATED : September 18, 2001
INVENTOR(S) : Nguyen-Dinh

It is certified that error appears in the above-identified patent and that said Letters Patent is hereby corrected as shown below:

Column 10, claim 1,
Line 29, "MO" should be -- Mo --.

Column 13, claim 9,
Line 15, "MO" should be -- Mo --.

Column 14, claim 11,
Line 8, "MO" should be -- Mo --.

Column 14, claim 12,
Line 25, "MO" should be -- Mo --.

Signed and Sealed this

Fifth Day of March, 2002

*Attest:*

JAMES E. ROGAN
*Attesting Officer*    *Director of the United States Patent and Trademark Office*